United States Patent [19]
Leftheris et al.

[11] 4,091,260
[45] May 23, 1978

[54] STRESS WAVE GENERATING COIL

[75] Inventors: Basil P. Leftheris, Huntington; Angelo Varisco, Woodbury, both of N.Y.

[73] Assignee: Grumman Aerospace Corporation, Bethpage, N.Y.

[21] Appl. No.: 792,706

[22] Filed: May 2, 1977

[51] Int. Cl.² .............................................. B21J 1/06
[52] U.S. Cl. ...................................... 219/149; 336/82
[58] Field of Search ................ 219/149; 336/222, 223, 336/225, 82, 96

[56] References Cited
U.S. PATENT DOCUMENTS

| | | | |
|---|---|---|---|
| 2,856,577 | 10/1958 | Schmidt | 336/232 |
| 3,340,489 | 9/1967 | Bastis et al. | 336/223 |
| 3,517,364 | 6/1970 | Mastrjukov | 336/223 |
| 3,731,370 | 5/1973 | Leftheris | 29/509 |
| 3,764,944 | 10/1973 | Erven | 336/222 |
| 4,030,057 | 6/1977 | Kohler et al. | 336/174 |

Primary Examiner—J. V. Truhe
Assistant Examiner—John H. Bouchard
Attorney, Agent, or Firm—Richard G. Geib; Mellor A. Gill

[57] ABSTRACT

Coil means between an annular casing electrode and a core casing electrode providing contact for high amplitude current conduction and flexibility during magnetic and structural loading in achieving substantially greater operational life in use with stress wave tooling.

9 Claims, 3 Drawing Figures

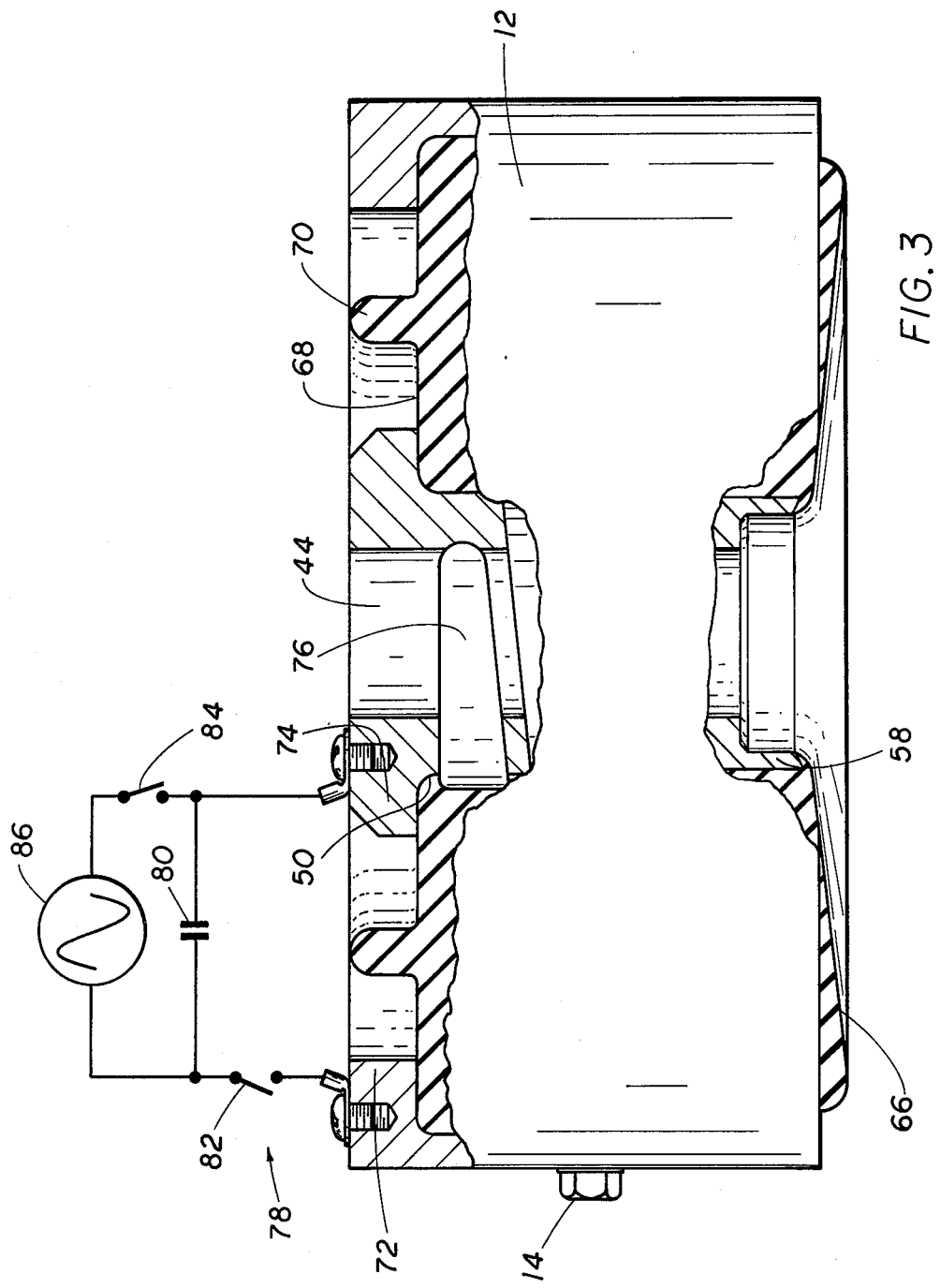

STRESS WAVE GENERATING COIL

BACKGROUND

In U.S. Pat. Nos. 3,646,791; 3,731,370; 3,824,824; 3,945,109; 3,961,739 and 3,962,694 assigned to the common assignee hereof there has been disclosed to those skilled in the art of metal forming and tooling how one can utilize a stress wave passing through metal to form, weld, rivet, etc. Such has been there devised to use electromagnetic forces to plasticize metal.

In accomplishing this basic advance in the tooling art it has been suggested by such patents that one uses a capacitor bank to establish a magnetic field in a pancake coil that induces a current in an adjacent driver. The stress wave is thereby generated due to the interaction of the coils magnetic field and that produced by the current to be around the adjacent driver.

Heretofore the pancake coils were unsupported, i.e. they were merely suspended in a plastic. The forces generated tended to fatigue this element. It is due to the need in obtaining a more adequate coil assembly to enable one to have sufficient operational life for stress wave tooling that this invention shall find particular utility.

DRAWING DESCRIPTION

FIG. 1A is an isometric broken detail of an envelope to encase a flat band to act as a coil in the structure of FIG. 1;

FIG. 1B is a cross-sectional detail of part of the coil of FIG. 1 with the envelope around and between adjacent coils;

FIG. 3 is a partially cross sectioned side view of the electromagnet means and capacitor controlled energy source therefor in schematic deployment therewith.

DETAILED DESCRIPTION

Figure 1:
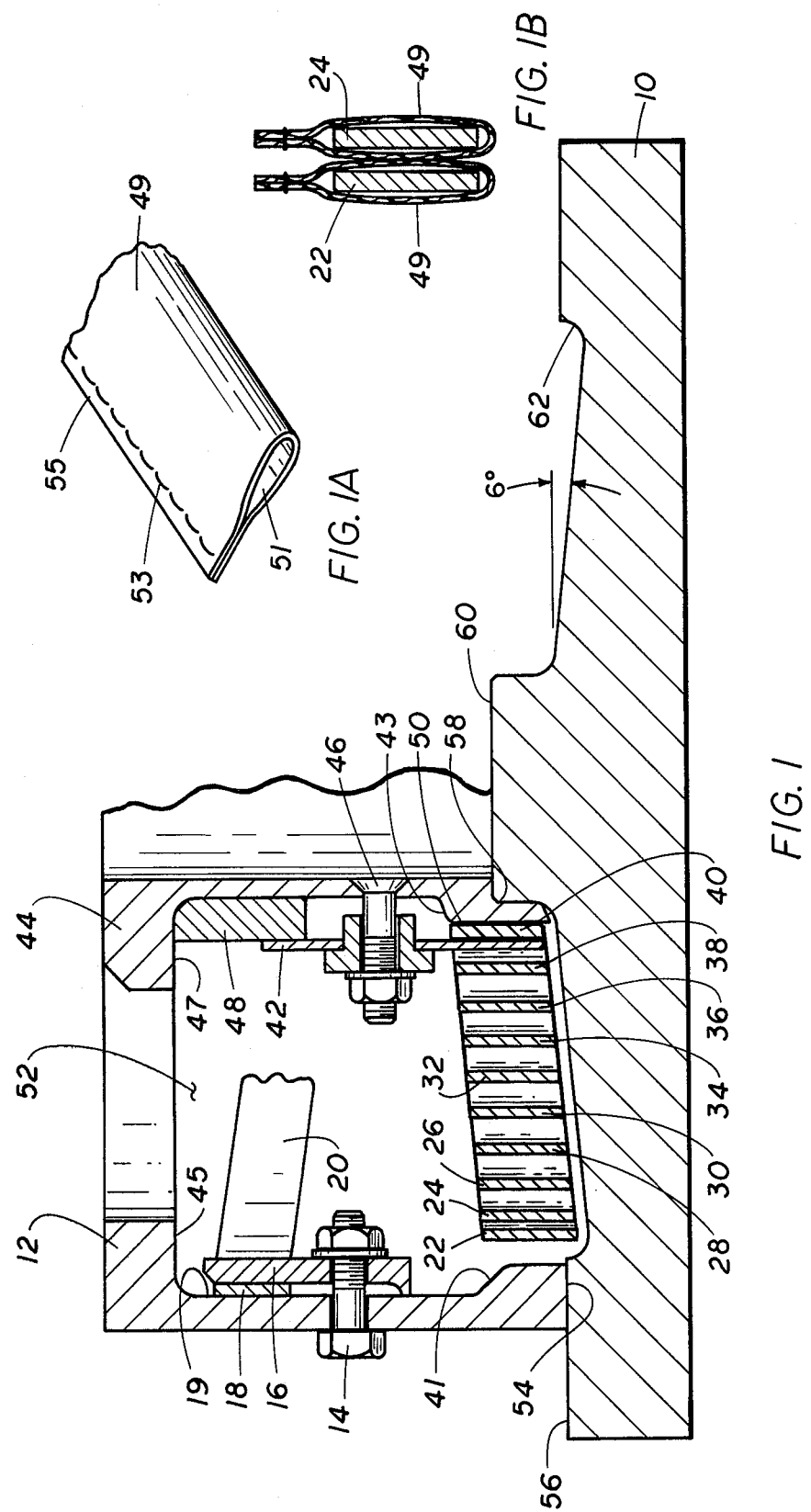
FIG. 1 is a partial cross section of a electromagnetic means resting on a potting fixture in accordance with this invention.

With more particular reference to FIG. 1 there is shown a potting base 10 on which parts of an electromagnetic device are being assembled according to this invention prior to the potting of the device. Specifically an outer, annular casing 12 has attached thereto, a coil 20 as by bolts 14 holding a clamp 16 such that end 18 of the copper pancake coil 20 is frictionally located against the casing 12. It is preferred that end 18 be polished as is also the inner surface 19 of steel casing so that good electrical continuity is possible with this clamp connection. The coil 20 spirals towards the face of the device and then coils for a predetermined number of turns 22, 24, 26, 28, 30, 32, 34, 36, 38 to inner end 40 adjacent the face. Inner end 40 is held by ring section 42 onto inner (core) casing 44 by means of bolts 46. A spacer segment 48 limits the downward force or location of ring section 42 to that which with polishing of end 40 plus the outer surface 50 of casing 44 will provide a good electrically conductive connection similar to that at casing 12. It may thus be realized that casing 12 and casing 44 are current carrying members as well as structural members.

As seen this structure, especially the coil, has spiraling portions 22, 24, 26, 28, 30, 32, 36 and 38 bridging annular cavity 52 between casing 12 and core 44. Such are extremely flexible so that when face 54 of casing 12 rests on surface 56 of base 10 and core shoulder 58 rests on boss 60 of base 10 they will assume the 6° angle of the annular surface 62 between the surface 56 and boss 60. It is preferred that the axial resiliency of portions 22, 24, 26, 28, 30, 32, 34, 36 and 38 be such that while they assume the 6° inclination from casing 12 to core 44 they will be spaced slightly above surface 62 with their forward thin edges parallel thereto. Actually it has been found that a particularly useful structure is provided if the coil is stiff enough to hold itself to a 40 to 60 thousandth difference in spacing above surface 62 during potting. Thereafter potting compounds providing good heat dissipation without being brittle encapsulate the coil. Such a potting compound is PRO-SEAL 790. Potting is done by pouring the compound into the annular cavity 52. This potting compound is resilient and will provide a hydrostatic pressure on the coil to maintain good contact between case 12 and coil 20 and coil 20 and core 44. It will fill the recesses to provide a limit in axial movement due to bearing on shoulders 41 and 43 of casings 12 and 44 and flanges 45 and 47 also thereof. One way to choose a potting compound in addition to the heat and brittleness factors is to select according to desired spring constant and/or durometer features.

In a recent construction the coil 20 is slipped through a folded over fiberglass blanket 49 within the envelope 51 limited by stitching 53. A tail 55 is thereby formed that will provide increased surface area for the potting compound to adhere to and improve the holding of the coils 22 through 38 in the desired position shown by FIG. 2. With reference to FIG. 1B this blanket 49 will insure insulation of the space between coils to prevent damage from arcing between adjacent coils, such as coils 22 and 24 shown. Without the blanket 49 one must obtain thorough flow and curing of the potting compound between such coils.

Figure 2:
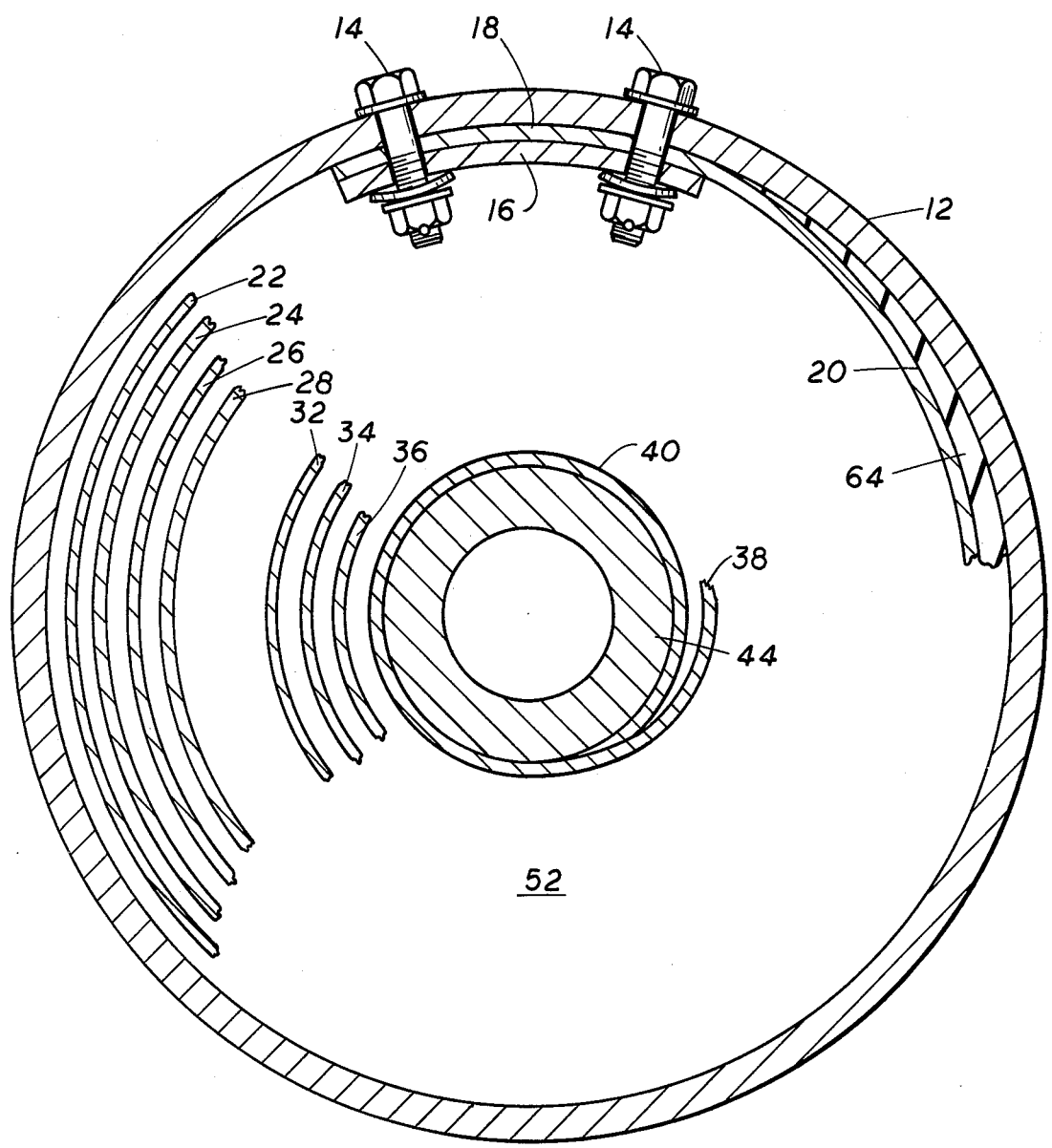
FIG. 2 is an end view of the electromagnetic means showing annular current carrying outer casing and inner current carrying core casing in cross section with broken detail of the coil bridging same.

Case 12 and core 44 are shown in full by FIG. 2 with the portions 22, 24, 26, 32, 34, 36 and 38 and ends 18 and 40 of coil 20 being in broken detail. An insulating shim 64 is located between casing 12 and pancake coil 20 to insure limited electrical contact at end 18 only before and after potting.

With reference to FIG. 3 the device is shown with the annular potting having angled or concave face 66 and rear face 68 within cavity 52. This rear face is provided with an anti-arc ring projection 70 that will interrupt the line of sight path between rear flanges 72 and 74 of casing 12 and core 44. In this embodiment the coil 20 is provided with a core coil 76 that is preformed for a tight frictional contact with outer surface 50 and the potting compound was the aforesaid PRO-SEAL with a spring constant of 100,000 lbs. per inch and a durometer reading of 85. With such the coil can take the designed impact without disintegrating.

Also seen by FIG. 3 is the power supply circuit 78 having a capacitor bank 80 switchable by switches 82 and 84 between a power source 86 and casing 12 and core 44.

In operation capacitor bank 80 is charged by energy source 86 when switch 84 is closed. After its charged, switch 84 is opened and switch 82 is closed. Thus a high amperage current pulse of a predetermined duration flows through casing 12, coil 20 and core 44. This creates a very high intensity magnetic field around this electromagnetic device.

The concave face 66 concentrates the output wave of the device such that plane wave characteristics are obtained. The prior art coils, as illustrated by assignees patents aforesaid do not have this ability and the structures using same required more elaborate focusing apparatus than is required with the improved structure of this invention.

We claim:

1. In stress wave focusing device a means to generate the stress wave, said means comprising:
   an electromagnetic coil having;
   an outer case having an electrical source terminal, said outer case being an annular structure to contain forces therewithin;
   an inner case having an electrical source terminal, said inner case being a core for the outer case and confine forces therebetween;
   a spring coil having a spiral from an outer periphery having attachment to and within said outer case to the coil inner diameter connected with said inner case, such that said coil has an inclined face between said outer case and inner case to provide a concave face therebetween; and;
   means to insulate adjacent spiralling portions of said coil within said outer case and said inner case.

2. The stress wave focusing device of claim 1 and further comprising means to maintain hydrostatic pressure on said coil such that forces are confined by said outer annular casing and said inner casing.

3. The device of claim 2 and further comprising a ring projection from the means to insulate maintaining hydrostatic pressure on said coil to prevent arcing between said outer case and said inner case.

4. A means for generating a stress wave said means comprising:
   an outer annular casing of conductor material;
   an inner casing of conductor material said inner casing beng the core for the outer casing;
   an insulated coil attached at one end to said outer casing and spiralling inwardly to be attached at the insulated coil inner extremity to said inner casing, said insulated coil being a flat copper coil enclosed by a fiberglass blanket with the copper coil conductively uniting the outer casing and inner casing;
   potting means between said outer casing and said inner casing and enclosing and uniting with said blanket so as to maintain hydrostatic pressure on said insulated coil with said outer annular casing and said inner casing withstanding such hydrostatic pressure; and
   a power supply connected across said outer casing and said inner casing including an energy source in parallel with a capacitor bank between said outer casing and said inner casing.

5. The means of claim 4 wherein the outer casing and inner casing are connected to said power supply by switch means that permit charging of said capacitor bank and discharging thereof via said coil in the space between the outer casing and inner casing.

6. The means of claim 5 wherein the fiberglass blanket has tail means held by the potting means to position the coil at one face of the inner casing and outer casing on an incline and provide a concave profile for said face.

7. The means of claim 4 wherein the inner casing is of lesser axial length than the outer casing and the insulated coil has a multiplicity of turns forming a concave profile between the outer casing and the inner casing in bridging the space between the shorter inner casing and the outer casing, which profile is resiliently held by the potting means providing a hydrostatic pressure on said coil in said space.

8. The means of claim 7 wherein the potting means extends into recesses of said outer casing and of said inner casing to provide axial restraint of said insulated coil.

9. A stress wave focusing device comprising:
   a source of high amperage current pulse;
   an annular current carrying structure member for said pulse;
   an inner current carrying structural member for said pulse;
   a current carrying coil spiraled between and electrically connecting said annular structural member and said inner structural member to provide a resilient face between the annular member and the inner member, said resilient face being inclined from the annular member toward the inner member such that it is concave to focus the stress wave generated in electrically pulsing said resilient face; and
   a heat dissipative non-brittle material integrating the aforesaid.

* * * * *